US007093613B2

(12) United States Patent
Höfling et al.

(10) Patent No.: US 7,093,613 B2

(45) Date of Patent: Aug. 22, 2006

(54) MAGNET ARRANGEMENT

(75) Inventors: Klaus Höfling, Lohr am Main (DE); Hans-Georg Schubert, Partenstein (DE)

(73) Assignee: Bosch Rexroth AG, Lohr/Main (DE)

( * ) Notice: Subject to any disclaimer, the term of this patent is extended or adjusted under 35 U.S.C. 154(b) by 346 days.

(21) Appl. No.: 10/476,370

(22) PCT Filed: May 8, 2002

(86) PCT No.: PCT/DE02/01652

§ 371 (c)(1), (2), (4) Date: Oct. 28, 2003

(87) PCT Pub. No.: WO02/093592

PCT Pub. Date: Nov. 21, 2002

(65) Prior Publication Data

US 2004/0129318 A1 Jul. 8, 2004

(30) Foreign Application Priority Data

May 17, 2001 (DE) ................................ 101 24 007

(51) Int. Cl.
*F16K 37/00* (2006.01)

(52) U.S. Cl. .................................. 137/554; 324/207.18

(58) Field of Classification Search ................ 137/554; 324/207.18

See application file for complete search history.

(56) References Cited

U.S. PATENT DOCUMENTS 3,005,467 A * 10/1961 Suchoza et al. ............ 137/554

(Continued)

FOREIGN PATENT DOCUMENTS

DE 2 132 212 A1 * 3/1983 ................. 137/554

(Continued)

OTHER PUBLICATIONS

Neuartige, kostengünstige Antriebe für Proportionalventile in derFluid-technik, (novel low-cost drives for proportional valves in fluid technology); "O+P oil hydraulics and pneumatics" 43 (1999) No. 4, pp. 252 to 258. Alfred Feuser, Torsten Witte, O+P Olhydraulik und Pneumatik 43 (1999).

*Primary Examiner*—John Rivell
(74) *Attorney, Agent, or Firm*—Martin A. Farber

(57) ABSTRACT

With a magnet arrangement for an electromechanical drive with a cylindrical armature guided in a pole tube, the position of the armature is transformed into an electrical signal. Provided for this is a displacement sensor which is connected to the armature and has a fixed part and a movable part. One side of the armature is formed such that it transfers the movement of the armature, and the other side of the armature is connected to the movable part of the displacement sensor. The pole tube is provided with a closure part on the side of the displacement sensor. A pressure tube is led to the outside through an axial clearance of the closure part. The movable part of the displacement sensor moves in the pressure tube. The pressure tube is enclosed by the fixed part of the displacement sensor. In order to prevent the displacement sensor from being damaged by vibrations, the fixed part of the displacement sensor is arranged in a clearance of the closure part. Such type magnet arrangements of this type are preferably used for electrical position feedback in fluidic valves.

17 Claims, 6 Drawing Sheets

U.S. PATENT DOCUMENTS

| | | | | | |
|---|---|---|---|---|---|
| 3,095,902 | A | * | 7/1963 | Caton | 137/554 |
| 3,349,840 | A | * | 10/1967 | Tope et al. | 137/554 |
| 3,850,196 | A | * | 11/1974 | Fales | 137/554 |
| 4,510,474 | A | * | 4/1985 | Romes et al. | 336/30 |
| 4,619,288 | A | * | 10/1986 | McPherson | 137/554 |
| 4,995,586 | A | * | 2/1991 | Gensberger et al. | 251/129.04 |
| 5,481,237 | A | * | 1/1996 | Sarfati et al. | 137/554 |
| 5,669,413 | A | | 9/1997 | Hegglin et al. | |
| 5,785,087 | A | * | 7/1998 | Takahashi et al. | 137/554 |
| 6,605,940 | B1 | * | 8/2003 | Tabrizi et al. | 324/207.18 |

FOREIGN PATENT DOCUMENTS

| | | |
|---|---|---|
| DE | 3241521 | 5/1984 |
| DE | 3506053 | 8/1986 |
| DE | 9208939 | 10/1992 |
| DE | 4208367 | 9/1993 |
| DE | 19707587 | 8/1998 |
| DE | 19724076 | 12/1998 |

* cited by examiner

MAGNET ARRANGEMENT

FIELD AND BACKGROUND OF THE INVENTION

The invention relates to a magnet arrangement for an electromechanical drive, especially for a fluidic valve with a cylindrical armature guided in a pole tube and with a magnetic coil enclosing the pole tube and with a displacement sensor which transforms the position of the armature into an electrical signal and has a fixed part and a movable part, in which arrangement one side of the armature is formed for transferring the movement of the armature and the other side of the armature is connected to the movable part of the displacement sensor, the pole tube being provided with a closure part on the side of the displacement sensor.

SUMMARY OF THE INVENTION

A magnet arrangement of this type is known as a component part of a hydraulic directional control valve from the publication "Neuartige, kostengünstige Antriebe für Proportionalventile in der Fluidtechnik" [novel, low-cost drives for proportional valves in fluid technology], the journal "O+P Ölhydraulik und Pneumatik" [O+P oil hydraulics and pneumatics] 43 (1999) No. 4, pages 252 to 258. Arranged in an axially displaceable manner in the housing of a directional control valve is a control piston, which controls the magnitude of the stream of pressure medium flowing via the directional control valve. In axial extension of the control piston, a pole tube is respectively screwed into the housing from each of both sides. Pushed over each pole tube is a coil. Guided in each of the two pole tubes is a cylindrical armature, which exerts a force deflecting the control piston when current is applied to the coil enclosing it. Connected to one of the armatures is a displacement sensor, which transforms the position of the armature into an electrical output signal, which is a measure of the position of the armature. Since the control piston of the directional control valve is non-positively coupled to the armature, the electrical output signal of the displacement sensor is also a measure of the position of the control piston. The displacement sensor has a fixed part in the form of a coil arrangement and a movable part, the core. The core is held on a core support, which is held on the armature on the side remote from the control piston. The pole tube is closed off on the side of the displacement sensor by a closure part, which is provided with an axial clearance. Through this clearance, a pressure tube is led out of the pole tube to the outside. The closure part and the pressure tube led through the latter close off the armature space from the outside in a pressure-tight manner. The part of the pressure tube protruding beyond the closure part in the axial direction is concentrically enclosed by a coil arrangement, which forms the fixed part of the displacement sensor. The coil arrangement is arranged in a housing of its own. This housing is held on the pole tube by a clamping clip, which engages in an outer annular groove of the closure part. Additionally provided is a serration, which prevents the housing from turning with respect to the pole tube. The core of the displacement sensor moves in the region of the pressure tube enclosed by the coil arrangement. The housing of the fixed part of the displacement sensor bears against the coil and secures the coil in the axial direction. This type of fixing of the coil is more complex than the fixing of the coil by a nut which engages in an external thread on the closure part, as is customary in the case of a pole tube without a displacement sensor, and increases the number of different parts. The arrangement of the displacement sensor in axial extension of the pole tube makes the directional control valve provided with the displacement sensor susceptible to vibrations, which in an extreme case may lead to the displacement sensor being torn off.

The invention is based on the object of providing a magnet arrangement of the type stated at the beginning in which the risk of damage caused by vibrations is significantly reduced.

According to the invention the fixed part (28*a* to 28*c*, 36; 28*a* to 28*c* 69) of the displacement sensor is arranged in a clearance (24) of the closure Part 13; 50; 67; 87; 100). Since the entire displacement sensor is arranged inside the closure part of the pole tube, a very compact construction of the magnet arrangement, in which the displacement sensor is also protected from mechanical damage, is obtained. A separate housing is not required for the fixed part of the displacement sensor. Moreover, there is no longer any need for measures for fastening such a housing on the pole tube. The closure parts containing the fixed part of the displacement sensor can be produced and tested on their own.

Advantageous developments of the invention are also presented. They comprise structural design details of the magnet arrangement, in particular those which allow a simple arrangement of the electronic components of a circuit arrangement for evaluating the output signals of the displacement sensor and also a simple connection of external electrical lines. Structural design measures which concern the configuration of the closure part of the pole tube are also presented.

BRIEF DESCRIPTION OF THE DRAWINGS

The invention is explained below more precisely with its further details on the basis of exemplary embodiments represented in the drawings, in which.

DETAILED DESCRIPTION OF THE PREFERRED EMBODIMENT

The same components are provided in the figures with the same designations.

Figure 1:
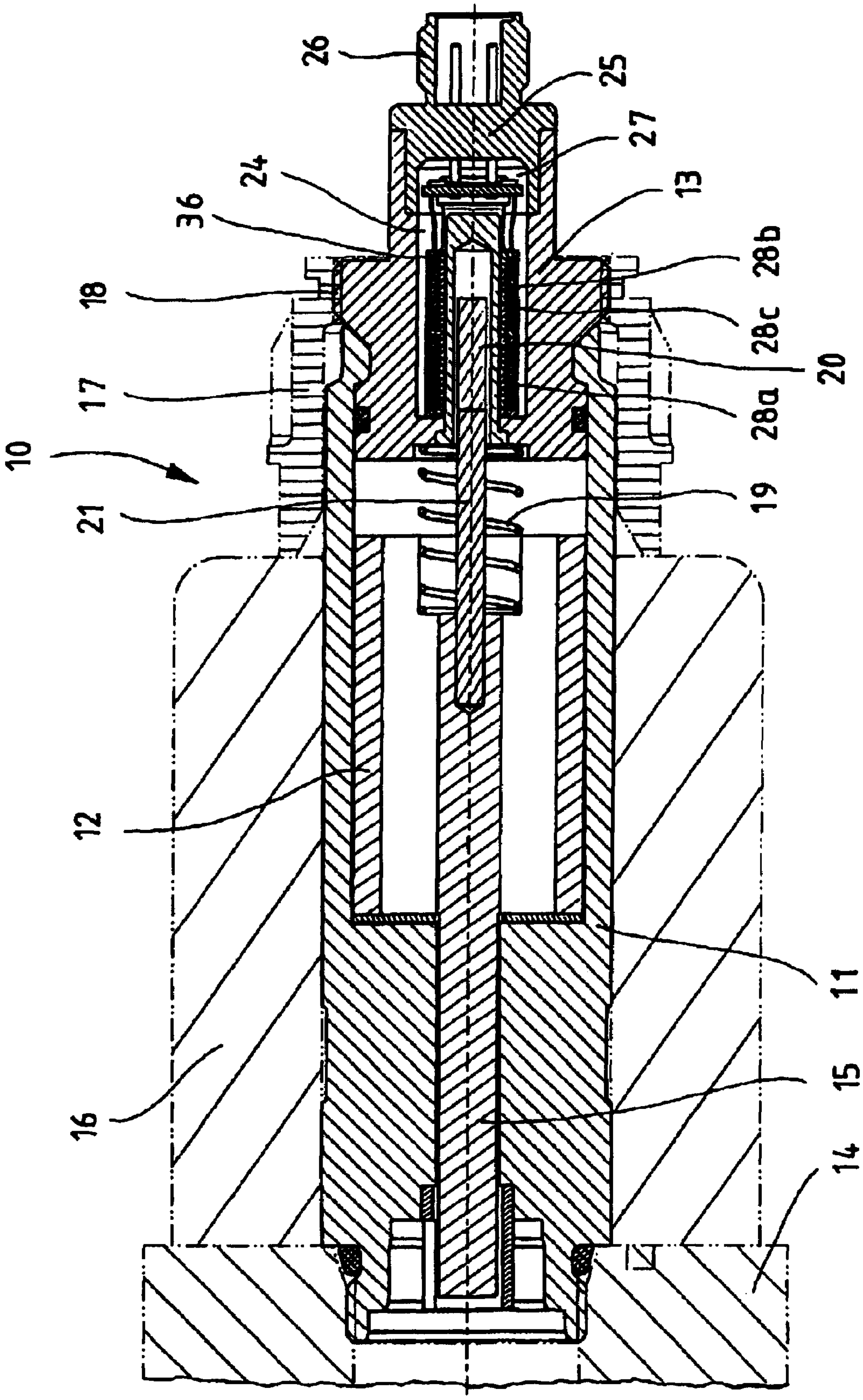
FIG. 1 shows a section through a magnet arrangement formed according to the invention.

FIG. 1 shows a section through a magnet arrangement 10 with a pole tube 11, an armature 12 guided in the pole tube 11 and a closure part 13. The pole tube 11 is screwed into a housing 14 of a fluidic valve, only represented schematically. Formed onto the armature 12 on the side facing the housing 14 is a tappet 15, which deflects a control piston (not represented here) of the valve. An only schematically represented magnetic coil 16 encloses the pole tube 11. The magnetic coil 16 is held between the housing 14 and a nut 17, which engages in an external thread 18 of the closure part 13. Arranged between the armature 12 and the closure part 13 is a spring 19. The spring 19 ensures a defined position of the armature 12 when the magnetic coil 16 is not energized. The spring 19 is no longer needed if a defined position of the armature 12 with the magnetic coil 16 deenergized is ensured in some other way. If the magnetic coil 16 is energized, the armature 12 is correspondingly deflected. Arranged on the side of the armature 12 facing the closure part 13 is a core holder 21, provided with a core 20. The core 20 forms the movable part of a displacement sensor. The displacement sensor transforms the position of the armature 12 into an electrical signal, which is a measure of the position of the armature 12. The closure part 13 is provided with a clearance 24, which is sealed by a terminating part 25. Details of the connection of the terminating part 25 to the closure part 13 are not specifically represented. The two parts may, for example, be adhesively bonded to each other. Integrated into the end face of the terminating part 25 is a connector 26. The terminating part 25 is provided with a clearance 27, which goes over into the clearance 24 of the closure part 13. A coil arrangement, comprising two secondary coils 28*a* and 28*b* and also a primary coil 28*c* surrounding the latter, forms together with a support 36 the fixed part of the displacement sensor. The support 36 with the coils 28*a*, 28*b* and 28*c* is arranged in the clearance 24 of the closure part 13. The coils 28*a* and 28*b* as well as 28*c* are arranged concentrically in relation to the core 20. Further details of the displacement sensor are described on the basis of FIG. 2.

Figure 2:
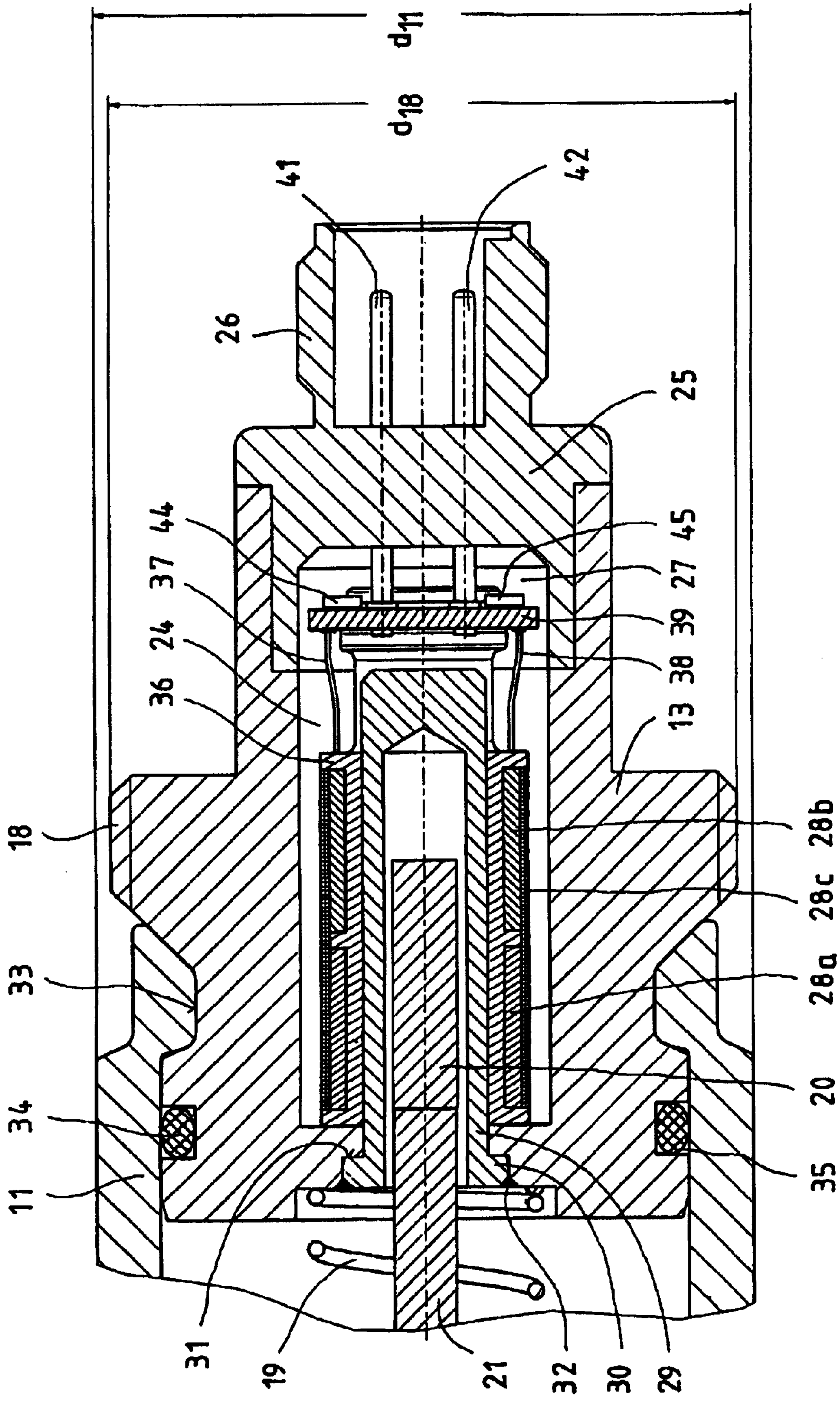
FIG. 2 shows the region of the closure part of the magnet arrangement represented in FIG. 1 in an enlarged representation.

FIG. 2 shows a detail from the magnet arrangement 10 represented in FIG. 1, in an enlarged representation. Components which have already been described above are not described again in connection with FIG. 2. A pressure tube 29, which is closed at one end and is provided at its open end with a collar 30, protrudes into the clearance 24 of the closure part 13. The collar 30 is supported on an annular face 21, facing the armature 12, of the closure part 13. A peripheral weld 32 ensures a pressure-tight connection between the collar 30 of the pressure tube 29 and the closure part 13. It is possible to dispense with the weld 32 if a pressure-tight connection between the collar 30 and the closure part 13 is established in some other way. As an alternative to this, it is possible to form the closure part and the pressure tube as one piece. The free end of the pole tube 11 is flanged into a first annular groove 33 of the closure part 13. A sealing ring 34 is arranged between the closure part 13 and the pole tube 11 in a further annular groove 25. In order that the magnetic coil 16 can be pushed onto the pole tube 11, the outside diameter $d_{18}$ of the external thread 18 is chosen to be slightly smaller than the outside diameter $d_{11}$ of the pole tube 11. Of the winding ends of the coils 28*a*, 28*b* and 28*c* arranged on the support 36, two winding ends are represented, designated by 37 and 38. In the simplest case, the winding ends 37 and 38 are connected directly to terminal pins 41, 42 of the connector 26. It is also possible, as schematically represented in FIG. 2, for a printed circuit board 39, which is loaded with electrical components 44, 45 of an electrical evaluation circuit, to be held on the terminal pins 41, 42 of the connector 26. In this case, the winding ends 37, 38 are connected to the input of the evaluation circuit and the output of the evaluation circuit is connected to the terminal pins 41, 42.

Figure 3:
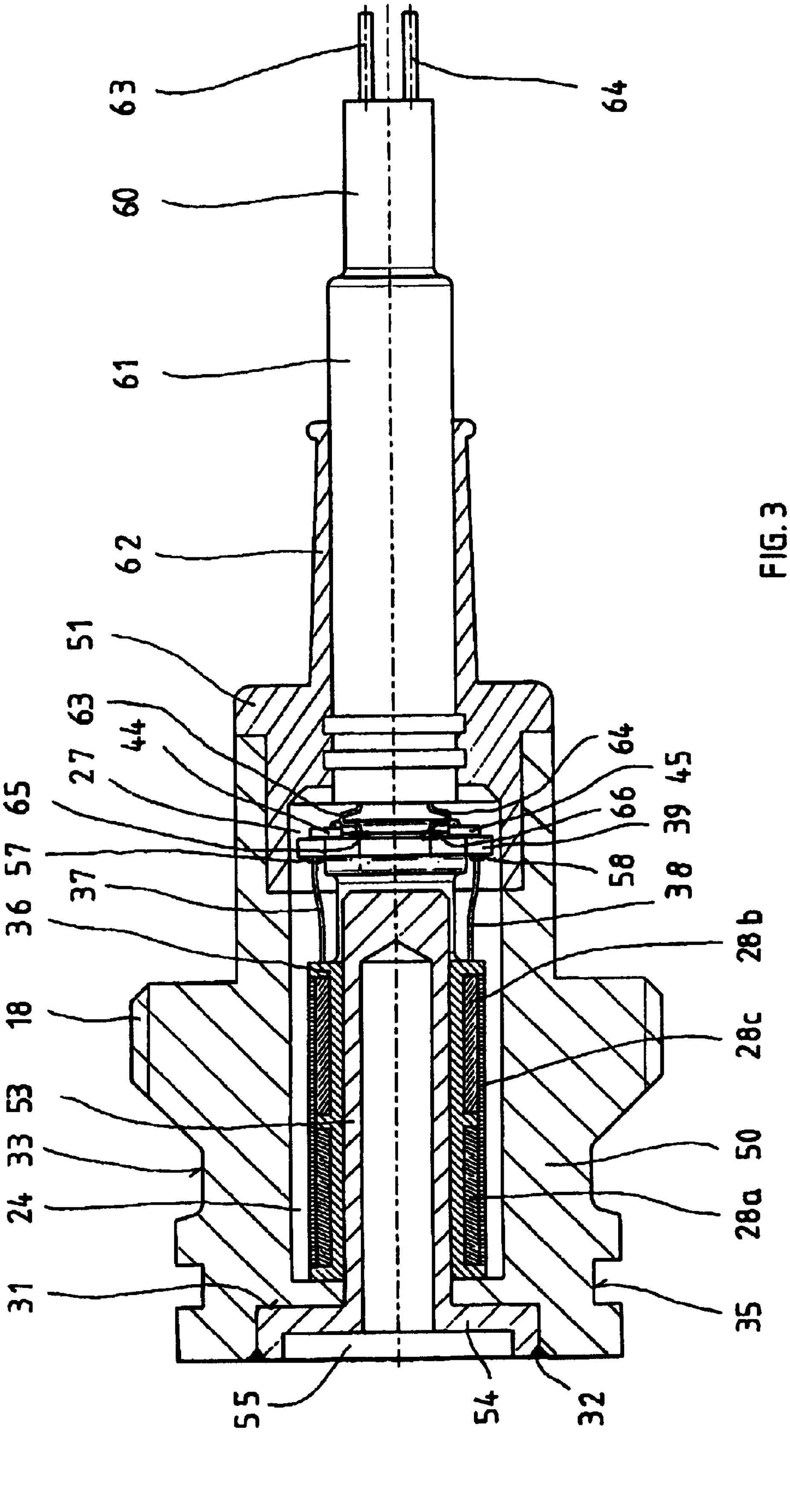
FIG. 3 shows a section through a further closure part with a terminating part for a magnet arrangement according to the invention.

FIG. 3 shows a further closure part 50 with a terminating part 51. As represented in FIGS. 1 and 2—the printed circuit board 39 is held on the support 36 for the coils 28*a*, 28*b* and 28*c* of the fixed part of the displacement sensor. The support 36 has been pushed over a pressure tube 53, which for its part is held on the closure part 50. The pressure tube 53 is provided with a collar 54. The collar 54 is supported on the annular face 31 of the closure part 50. The collar 54 is provided on the side facing the armature 12 with a clearance 55, which is formed as a guide for the spring 19 represented in FIG. 1. The collar 54 is connected in a pressure-tight manner to the closure part 50 by a peripheral weld 32. The printed circuit board 39 is provided with soldering points 57 and 58, to which the winding ends 37 and 38 are connected. An electrical cable 60 is led through the terminating part 51 in the axial direction. In the region where it passes through, the cable 60 is surrounded by a grommet 61. Formed onto the terminating part 51 as an additional means for preventing kinking is a tubular continuation 62, extending the terminating part 51. The individual lines 63, 64 of the cable 60 are connected to further soldering points 65, 66 of the printed circuit board 39. In the simplest case, i.e. when no evaluation circuit is provided, the soldering points 57, 58 are connected to the soldering points 65, 66. In the exemplary embodiment represented in FIG. 3, the printed circuit board 39 is connected to an evaluation circuit schematically represented by the electronic components 44, 45, the input of which is connected to the soldering points 57, 58 and the output of which is connected to the soldering points 65, 66.

Figure 4:
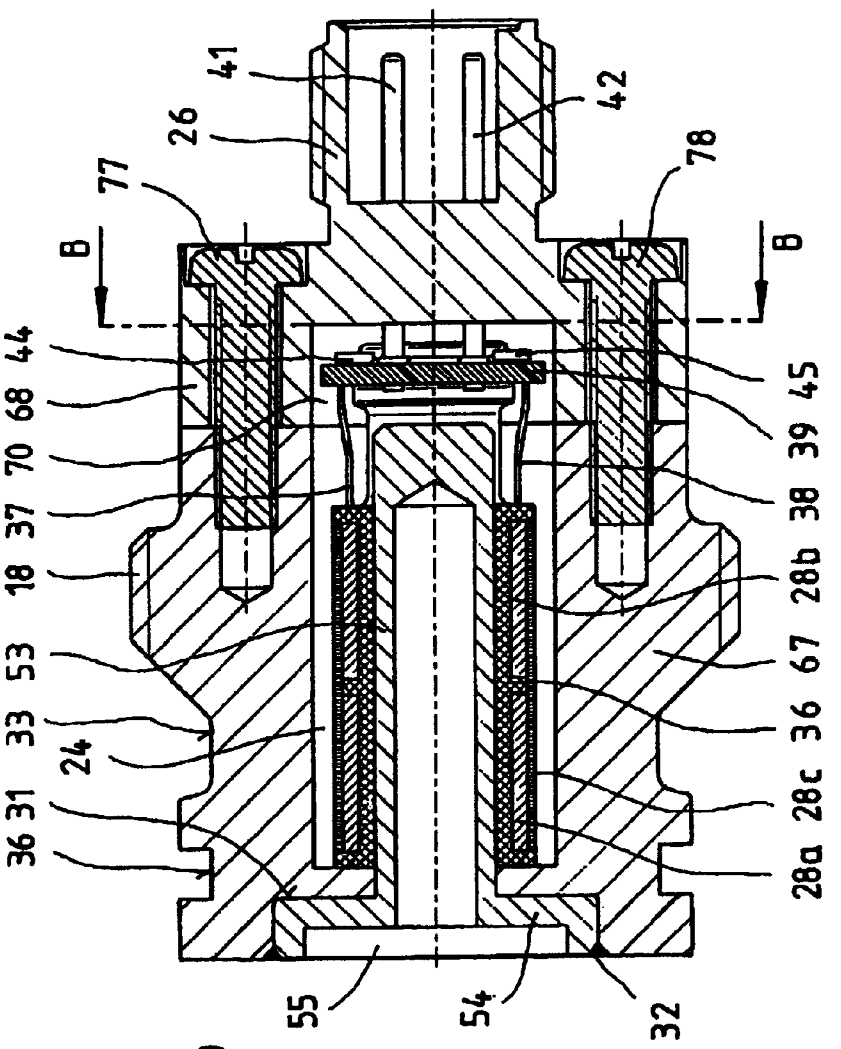
FIG. 4 shows a section through a third closure part with a terminating part for a magnet arrangement according to the invention.

FIG. 4 shows a third closure part 67, in which a terminating part formed as a plate 68 is screwed to the closure part 67. Formed onto the plate 68 is the connector 26 with the terminal pins 41, 42. The printed circuit board 39 is mechanically held on the terminal pins 41, 42. As represented in FIG. 2, the support 36 is held on the printed circuit board 39. The unit formed by the plate 68, the terminal pins 41, 42, the printed circuit board 39 and the support 36 has been pushed over the pressure tube 53. The printed circuit board 39 with the schematically represented electrical components 44, 45 of an evaluation circuit is arranged in a clearance 70 of the plate 68. The winding ends 37, 38 of the coils 28*a*, 28*b*, 28*c* are connected to the input of the evaluation circuit. The terminal pins 41, 42 of the connector 26 are electrically connected to the output of the evaluation circuit. The plate 68 is held on the closure part 67 by screws distributed over the circumference, two of which screws 77, 78 can be seen in FIG. 4.

Figure 5:
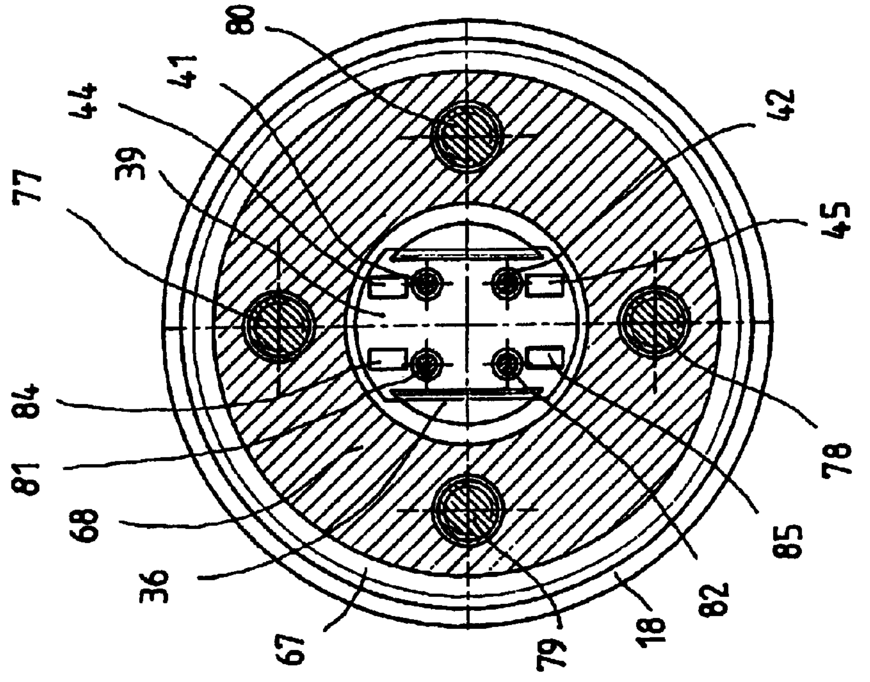
FIG. 5 shows a section through the terminating part represented in FIG. 4.

FIG. 5 shows a section along the line B—B represented in FIG. 4. In this representation, two further screws 79 and 80 in addition to the screws 77 and 78 can be seen. In this section, two further terminal pins 81, 82 and also two further electronic components 84, 85 can also be seen.

Figure 6:
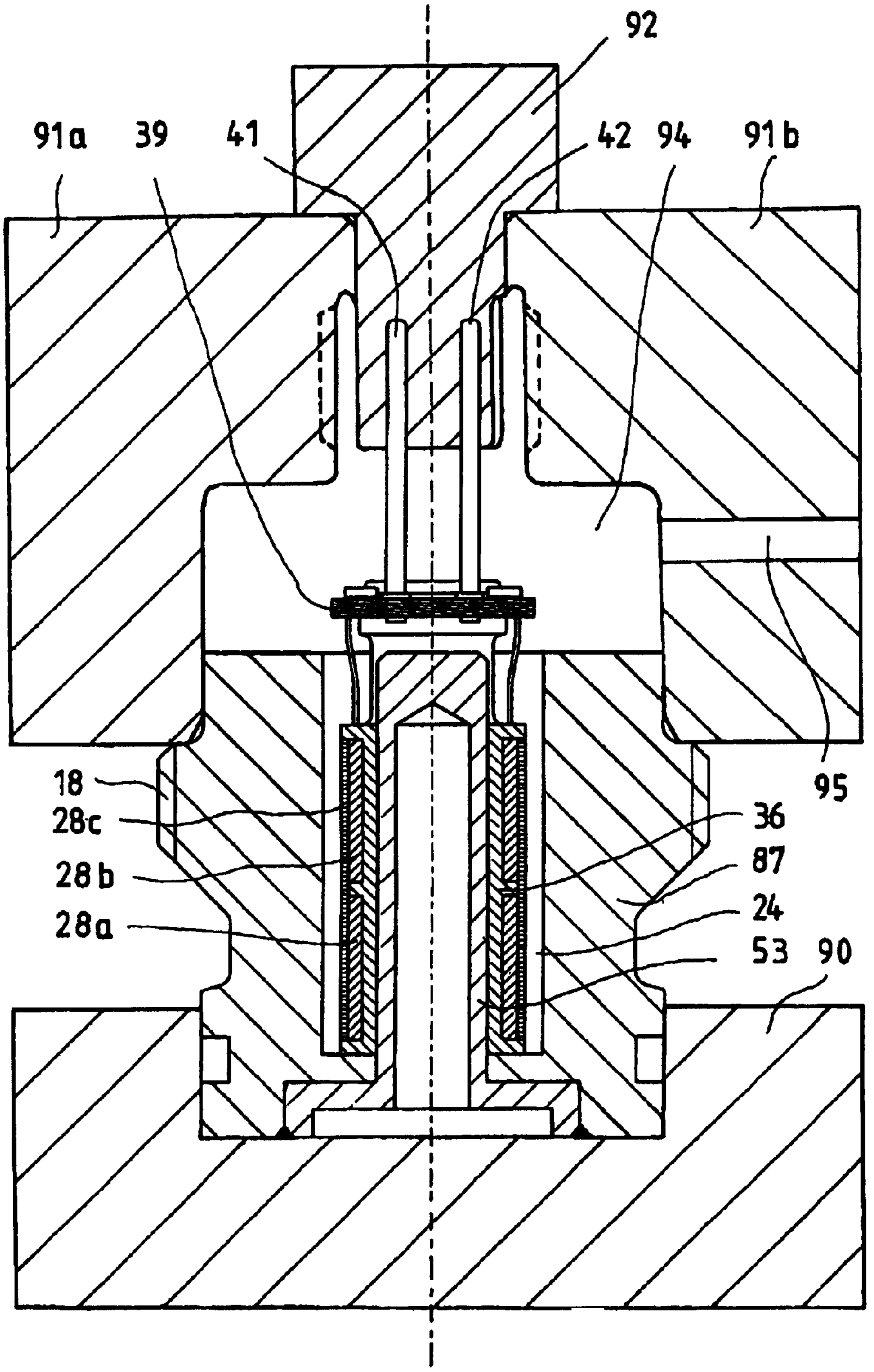
FIG. 6 shows a section through a fourth closure part for a magnet arrangement according to the invention and FIG. 7 shows a section through a further closure part with a terminating part, the closure part and the terminating part being connected to each other by means of a screw drive.

FIG. 6 shows a further closure part 87. The production of the terminating part of the closure part 87 takes place—as described below—by encapsulating with plastic. The pressure tube 53 protrudes into the clearance 24 of the closure part 87 and is connected to it in a pressure-tight manner. The support 36 with the coils 28*a*, 28*b*, 28*c* has been pushed over the pressure tube 53. The printed circuit board 39 is held on the support 36. The terminal pins 41, 42 are mechanically held on the printed circuit board 39. This formation is inserted into an only schematically represented multi-part mold, which comprises a base plate 90, two mold halves 91*a*, 91*b* and an insert 92. Together with the insert 92, the mold halves 91*a*, 91*b* enclose a space 24, which determines the later shape of the terminating part and of the connector formed onto the latter. The mold halves 91*a*, 91*b* are divided along a plane running through the center axis of the closure part 87, in such a way that demolding of the closure part provided with the terminating part and the connector is possible. During encapsulation, the space 94 and the clearance 24 are filled with liquid plastic via an only schematically represented channel 95. In order that the plastics compound can distribute itself uniformly in the mold, vent holes are provided in the customary way in the mold and/or in the closure part 87. They are not represented in FIG. 6. Since the plastic also touches parts of the electrical circuit, it is necessary to use an electrically insulating plastic for the terminating part. For demolding the closure part 87 provided with the terminating part and connector, after the plastics compound has solidified the mold halves 91*a* and 91*b* are pulled apart laterally and the insert 92 is pulled out upward.

Figure 7:
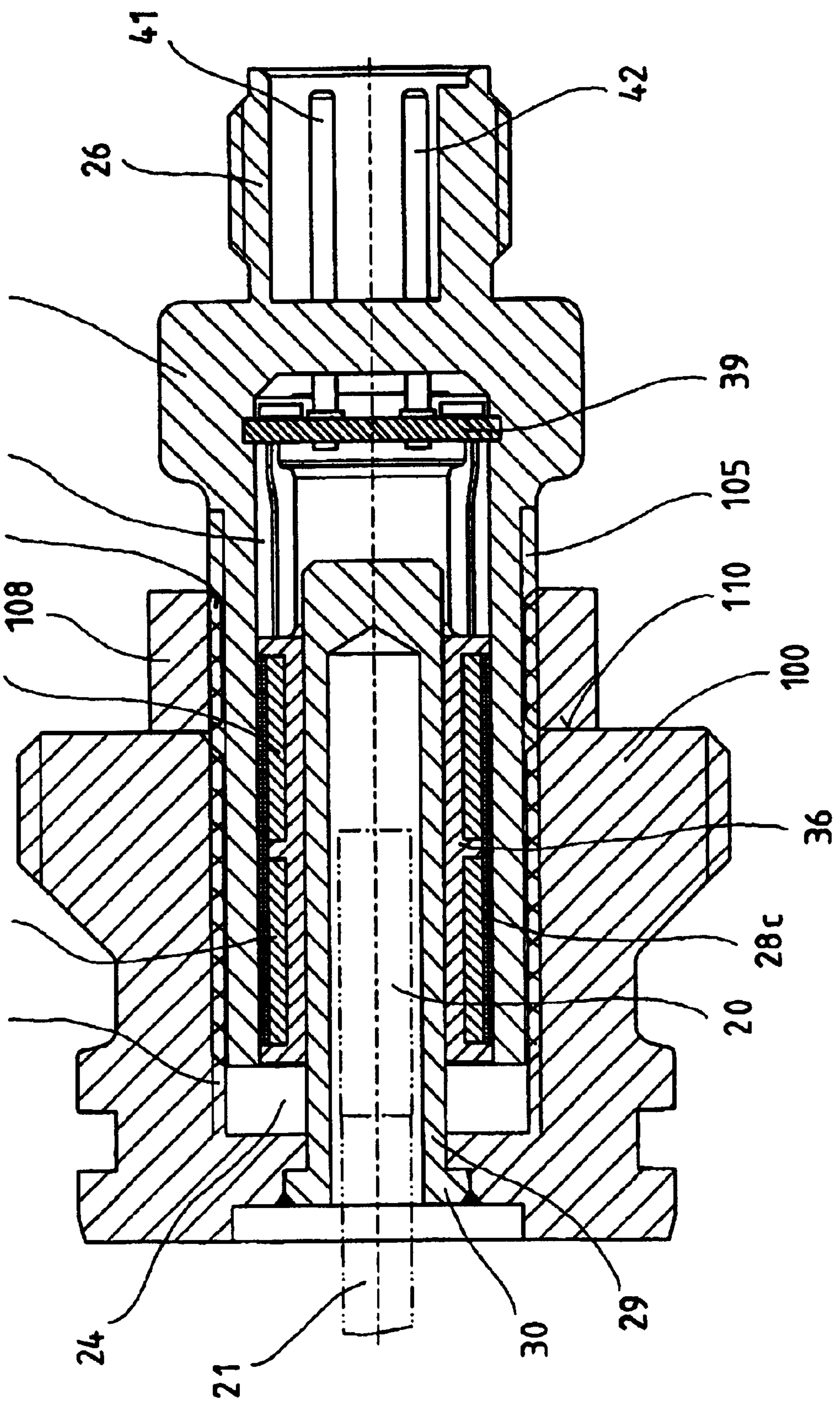

FIG. 7 shows a closure part 100, to which a terminating part 101 is connected by means of a screwed connection. Wherever details which have already been described in connection with previous figures are represented in FIG. 7, the same designations as in the previous figures are used hereafter for the corresponding components. The pressure tube 29 protrudes into the cylindrically formed clearance 24 of the closure part 100. It is supported with its collar 30 on the end face, facing the armature of the magnet arrangement, of the closure part 100. The clearance 24 of the closure part 100 is provided with an internal thread 104, and the terminating part 101 is provided with a corresponding external thread 105. The internal thread 104 of the closure part 100 and the external thread 105 of the terminating part 101 form a screw drive, which transforms a rotational movement of the terminating part 101 with respect to the closure part 100 into an axial movement between the two parts. The printed circuit board 39 is held on the terminating part 101. Held on the printed circuit board 39 are the support 36 with the coils 28*a*, 28*b* and 28*c*, which form the fixed part of the displacement sensor. The region of the terminating part 101 in which the support 36 with the coils 28*a* to 28*c* is located is arranged inside the clearance 24 of the closure part 100. The support 36 concentrically encloses the pressure tube 29. The distance between the pressure tube 29 and the support 36 is chosen such that the support 36 can move with slight play with respect to the pressure tube 29. Screwed onto the external thread 105 of the terminating part 101 is a check nut 108, which is provided with an internal thread 107 and prevents unintentional turning of the terminating part 101 with respect to the closure part 100 during the operation of the displacement sensor. In order to secure the relative position of the terminating part 101 with respect to the closure part 100, the check nut 108 is screwed against the closure part 100, its internal thread 107 being supported on the external thread 105 of the terminating part 101, and the end face provided with the designation 110 being supported on the closure part 100. Formed onto the end remote from the closure part 100 of the terminating part 101 is the connector 26 with the terminal pins 41, 42. The position of the core 20, which forms the movable part of the displacement sensor, is represented by dashed lines. The axial distance between the fixed part and the movable part of the displacement sensor can be changed by turning the terminating part 101 with respect to the closure part 100. The terms "fixed part" and "movable part" of the displacement sensor relate to the operation of the displacement sensor in which the armature of the magnet arrangement moves the core 20 and the support 36 with the coils 28*a* to 28*c* is arranged fixedly with respect to the valve housing. In order to adjust the displacement sensor, the core is held in a fixed position in relation to the valve housing and the terminating part 101 is turned with respect to the closure part 100, and consequently with respect to the valve housing, until the electrical output signal present at the terminal pins 41, 42 has assumed a desired value. This position is secured, as described above, by tightening the check nut 108 against unintentional turning.

The configuration of the closure part and terminating part described on the basis of FIG. 7 allows a zero displacement of the electrical output signal to be performed as and when required by mechanical means. With such a zero displacement it is possible, for example, to correct production-related tolerances with regard to the axial position of the fixed part of the displacement sensor. In addition, it is also possible, by an axial adjustment of the fixed part of the displacement sensor with respect to the closure part, to change the range of the electrical output signal, so that, for example, instead of an output signal which moves between a negative maximum value and a positive maximum value, an electrical output signal which moves between zero and a positive maximum value or between zero and a negative maximum value is obtained.

By combining the electrical output signal of the displacement sensor with predeterminable threshold values in the form of electrical signals, the steady output signal of the displacement sensor can be used as and when required to generate switching signals which signal the reaching of positions of the control piston of a directional control valve determined by the threshold values. The combining of the electrical signals may take place both outside the closure part and inside the closure part, for example by the arrangement of additional electronic components on the printed circuit board 39. The switching signals are available in addition to the steady output signal of the displacement sensor and can be further processed independently of one another in devices for control and/or monitoring.

The invention claimed is:

1. A magnet arrangement for an electromechanical drive, especially for a fluidic valve, with a cylindrical armature guided in a pole tube and with a magnetic coil enclosing the pole tube and with a displacement sensor which transforms the position of the armature into an electrical signal and has a fixed part and a movable part, in which arrangement one side of the armature is formed for transferring the movement of the armature and an other side of the armature is connected to the movable part of the displacement sensor, the pole tube being provided with a closure part on a side of the displacement sensor, wherein the fixed part (28*a* to 28*c*, 36; 28*a* to 28*c*, 69) of the displacement sensor is arranged in a clearance (24) of the closure part (13; 50; 67; 87; 100).

2. The magnet arrangement as claimed in claim 1, wherein a terminating part (25; 51; 68) is held on the closure part (13; 50; 67; 87; 100).

3. The magnet arrangement as claimed in claim 2, wherein electrical connecting lines (63, 64) of the displacement sensor are led through the terminating part (51).

4. The magnet arrangement as claimed in claim 2, wherein a connector (26) is integrated into the terminating part (25; 68; 101).

5. The magnet arrangement as claimed in claim 2, wherein the terminating part (25; 51; 68) is provided with a clearance (27; 70), which goes over into the clearance (24) of the closure part (13; 50; 67).

6. The magnet arrangement as claimed in claim 5, wherein a printed circuit hoard (39) is arranged in the clearance (27; 70) of the terminating part (25; 51; 68; 101).

7. The magnet arrangement as claimed in claim 6, wherein the printed circuit hoard (39) is held on terminal pins (41, 42) of a connector (26).

8. The magnet arrangement as claimed in claim 1, wherein the movable part (20) of the displacement sensor is guided in a pressure tube (29; 53).

9. The magnet arrangement as claimed in claim 8, wherein the pressure tube (29; 53) is provided with a collar (30; 54), which is supported on an annular face (31), facing the armature (12), of the closure part (13; 50; 67; 87; 100).

10. The magnet arrangement as claimed in claim 9, wherein the collar (54) is formed as a guide (55) for a spring (19) arranged between the armature (12) and the closure part (50; 67; 87).

11. The magnet arrangement as claimed in claim 1, wherein the closure part (13; 50; 67; 87; 100) is provided with an external thread (18), an outside diameter (d18) of which is smaller than the outside diameter (d11) of the pole tube (11).

12. The magnet arrangement as claimed in claim 2, wherein the terminating part is made of plastic and molded onto the closure part (87).

13. The magnet arrangement as claimed in claim 2, wherein the fixed part (28*a* to 28*c*, 36) of the displacement sensor is held on the terminating part (101), and the terminating part (101) is settable with respect to the closure part (100) in axial direction.

14. The magnet arrangement as claimed in claim 13, wherein the terminating part (101) is connected to the closure part (100) by a screw drive (104, 105).

15. The magnet arrangement as claimed in claim 14, wherein the closure part (100) is provided with an internal thread (104) and the terminating part (101) is provided with an external thread (105).

16. The magnet arrangement as claimed in claim 13, wherein securing means (108) which prevent unintentional turning of the terminating part (101) with respect to the closure part (100) are provided.

17. The magnet arrangement as claimed in claim 16, wherein the terminating part (101) is provided with a check nut (108), an internal thread (107) of which is supported on an external thread (105) of the terminating part (101) and an end face (110) of which, facing the closure part (100), is supported on the latter.

* * * * *